United States Patent [19]

Rapoport et al.

[11] Patent Number: 5,262,938
[45] Date of Patent: Nov. 16, 1993

[54] FOOD SERVICES ROUTING SYSTEM INCLUDING SEATING LOCATION DISPLAY

[76] Inventors: Lawrence D. Rapoport, 2278 Manning Ave., Los Angeles, Calif. 90064; Pascal Demilly, 9600 19th St., Apt. #18, Alta Loma, Calif. 91701

[21] Appl. No.: 614,424
[22] Filed: Nov. 16, 1990
[51] Int. Cl.$^5$ ............................................. G06F 15/21
[52] U.S. Cl. ................................................... 364/401
[58] Field of Search ................ 364/400, 401, 406, 405

[56] References Cited

U.S. PATENT DOCUMENTS

| | | | |
|---|---|---|---|
| 4,222,111 | 9/1980 | Sloan et al. | 364/900 |
| 4,388,689 | 6/1983 | Hayman et al. | 364/401 |
| 4,415,065 | 11/1983 | Sandstedt | 364/401 X |
| 4,553,222 | 11/1985 | Karland et al. | 364/900 |
| 4,722,053 | 1/1988 | Dubno et al. | 364/401 |
| 5,003,472 | 3/1991 | Perrill et al. | 364/401 |
| 5,032,834 | 7/1991 | Kane et al. | 340/825.28 |

FOREIGN PATENT DOCUMENTS

| | | | |
|---|---|---|---|
| 0134532 | 10/1979 | Japan | 364/401 |
| 0003581 | 1/1984 | Japan | 364/401 |
| 0142669 | 8/1984 | Japan | . |
| 0003781 | 1/1985 | Japan | 364/401 |
| 0202274 | 9/1986 | Japan | . |
| 0037768 | 2/1987 | Japan | . |
| 0050919 | 3/1987 | Japan | . |
| 2168515 | 6/1986 | United Kingdom | 364/401 |
| 2196766 | 5/1988 | United Kingdom | 364/401 |
| 83/04327 | 12/1983 | World Int. Prop. O. | . |

OTHER PUBLICATIONS

*IBM Technical Disclosure Bulletin*, vol. 24, No. 9, Feb. 1982, Wilkinson, pp. 4630-4631.
*Electronic International*, vol. 54, No. 10, 1981, Gosch, "Computer Cuts the Distance a Waiter Walks", pp. 83-84.

*Primary Examiner*—Roy N. Envall, Jr.
*Assistant Examiner*—David Huntley
*Attorney, Agent, or Firm*—Spensley Horn Jubas & Lubitz

[57] ABSTRACT

A method for routing food orders in a dining establishment using a computer having a monitor and a first printer at an ordering location and a second printer located at a food preparation location and linked to the computer, including the steps of: (a) displaying on the monitor a main screen having a principal display region presenting a display of patron seating locations in the establishment and a function region presenting a display of targets which can be selected to control the ordering of food items and the production of a bill; (b) selecting a seating location on the principal display region to display on the monitor an order screen displaying menu items in an order region and a bill in a bill region for the selected location; (c) selecting menu items on the food order screen in order to transfer each food item to the bill region; (d) causing at least selected items appearing in the bill region to be printed on the second printer; and (e) generating a printed bill on the first printer.

15 Claims, 23 Drawing Sheets

FIGURE 7

[GUEST] [DONE] [CANCEL]

JOHN — 72

2

74

PARTY NUMBER: ☐

| 7 | 8 | 9 |
| 4 | 5 | 6 |
| 1 | 2 | 3 |
| 0 | +10 | CL |

OPTIONS — 76

☐ FOR TRAINING

ORDER BY
● CATEGORY
◉ SEAT

USE COURSE
● MANUAL
◉ PRE-ASSIGNED

PRINT ORDER
● ALL AT ONCE
◉ IN STAGES

DEFAULT PRICE
● REGULAR
◉ EMPLOYEE

FIGURE 8

| SEAT | CRSE A | QTY | CNCL | CMNT | DONE | NEW | BAL FWRD | MENU 2 |

SELECT ITEM
- SODA
- COFFEE
- DECAF
- ICED TEA
- COBB SALAD
- HAMBURGER
- CHEESEBURGER
- TURKEY SAND
- APPLE PIE
- CHERRY PIE

CATEGORY
- QUICK
- APPETIZER
- SALAD
- SANDWICH
- ENTREE
- DRINKS
- DESSERT

OPEN ITEM

SELECTION DONE

JOHN
TABLE: 2    PARTY NUMBER: 2    BILL: 1

| 1 | HAMBURGER    | 5.95 |
|   | NO ONIONS    |      |
| 1 | TURKEY SAND  | 6.50 |
| 1 | COFFEE       | 1.50 |
| 1 | ICED TEA     | 1.50 |
| 1 | APPLE PIE    | 2.95 |

FIGURE 10

| SEAT | CRSE A | QTY | CNCL | CMNT | DONE | NEW | BAL FWRD | MENU 2 |

JOHN

TABLE: 2   PARTY NUMBER: 2   BILL: 1

| | | |
|---|---|---|
| 1 | HAMBURGER | 5.95 |
| | NO ONIONS | |
| 1 | TURKEY SAND | 6.50 |
| 1 | COFFEE | 1.50 |
| 1 | ICED TEA | 1.50 |
| 1 | APPLE PIE | 2.95 |

CATEGORY
- APPETIZER
- SANDWICH
- ENTREE
- ...
- DESSERT

○ NONE
○ COURSE A
○ COURSE B
○ COURSE C
○ COURSE D
○ COURSE E

CANCEL

SELECTION DONE

OPEN ITEM

| SEAT | CRSE A | QTY | CNCL | CMNT | DONE | NEW | BAL FWRD | MENU 2 |

JOHN

TABLE: 2    PARTY NUMBER: 2    BILL: 1

| | | |
|---|---|---|
| 1 | HAMBURGER | 5.95 |
| | NO ONIONS | |
| 1 | TURKEY SAND | 6.50 |
| 1 | COFFEE | 1.50 |
| 1 | ICED TEA | 1.50 |
| 1 | APPLE PIE | 2.95 |

SELECT ITEM

SODA
COFFEE
DECAF
ICED TEA
COBB SALAD
HAMBURGER
CHEESEBURGER
TURKEY SAND
APPLE PIE
CHERRY PIE

QUANTITY: 2

| 7 | 8 | 9 |
| 4 | 5 | 6 |
| 1 | 2 | 3 |
| 0 | +10 | CL |

92

OPEN ITEM

SELECTION DONE

FIGURE 15

| SEAT | CRSE A | QTY | CNCL | CMNT | DONE | NEW | BAL FWRD | MENU 2 |

TABLE: 2    JOHN
PARTY NUMBER: 2    BILL: 1

| | | |
|---|---|---|
| 1 | HAMBURGER | 5.95 |
| | NO ONIONS | |
| 1 | TURKEY SAND | 6.50 |
| 1 | COFFEE | 1.50 |
| 1 | ICED TEA | 1.50 |
| 1 | APPLE PIE | 2.95 |

SELECT IT

SODA
COFFEE
DECAF
ICED TEA
COBB SALAD
HAMBURGER
CHEESEBURGER
TURKEY SAND
APPLE PIE
CHERRY PIE

◉ LUNCH
◉ DINNER

CANCEL

— 104

OPEN ITEM    SELECTION DONE

FIGURE 16

| SEAT | CRSE A | QTY | CNCL | CMNT | DONE | NEW | BAL FWRD | MENU 2 |

JOHN

TABLE: 2    PARTY NUMBER: 2    BILL: 1

| | | |
|---|---|---|
| 1 | HAMBURGER | 5.95 |
| | NO ONIONS | |
| 1 | TURKEY SAND | 6.50 |
| 1 | COFFEE | 1.50 |
| 1 | ICED TEA | 1.50 |
| 1 | APPLE PIE | 2.95 |

☒ FIRE COURSE A IN: [ 0 ] MIN.
☒ FIRE COURSE B IN: [ 10 ] MIN.
☐ FIRE COURSE C IN: [   ] MIN.

[ DONE ]

106

OPEN ITEM    SELECTION DONE

FIGURE 17

| TAX | ALT PRICE | DISC | VOID | EDIT | PRINT | DONE |

JOHN  BILL: 1
TABLE: 2  PARTY NUMBER: 2

| 1 | HAMBURGER | 5.95 |
|---|---|---|
|   | NO ONIONS |   |
| 1 | TURKEY SAND | 6.50 |
| 1 | COFFEE | 1.50 |
| 1 | ICED TEA | 1.50 |
| 1 | APPLE PIE | 2.95 |

FIGURE 18

| TAX | ALT PRICE | DISC | VOID | EDIT | PRINT | DONE |

JOHN

TABLE: 2    PARTY NUMBER: 2    BILL: 1

| 1 | HAMBURGER | 5.95 |
|---|---|---|
|   | NO ONIONS |  |
| 1 | TURKEY SAND | 6.50 |
| 1 | COFFEE | 1.50 |
| 1 | ICED TEA | 1.50 |
| 1 | APPLE PIE | 2.95 |

108

○ USER SELECTION
○ ALL ITEMS

REASON:
◉ SERVICE ERROR
◉ FOOD PROBLEM
◉ COMP
◉ OTHER

COMMENT:

| DONE | CANCEL |

FIGURE 20

| TAX | ALT PRICE | DISC | VOID | EDIT | PRINT | DONE |

JOHN

TABLE: 2    PARTY NUMBER: 2    BILL: 1

| 1 | HAMBURGER | 5.95 |
|---|---|---|
|   | NO ONIONS |  |
| 1 | TURKEY SAND | 6.50 |
| 1 | COFFEE | 1.50 |
| 1 | ICED TEA | 1.50 |
| 1 | APPLE PIE | 2.95 |

112

◉ USER SELECTION
◉ ALL ITEMS

TAX RATE:
◉ NON TAXABLE
◉ TAX: 6.50%
◉ TAX: 8.00%

[CANCEL]

FIGURE 21

CASH | CRED CARD | CHECK | HOUSE | SHORT | TX TAB | REFUND | DONE

JOHN

TABLE: 2    PARTY NUMBER: 2    BILL: 1

| | | |
|---|---|---|
| 1 | HAMBURGER | 5.95 |
| | NO ONIONS | |
| 1 | TURKEY SAND | 6.50 |
| 1 | COFFEE | 1.50 |
| 1 | ICED TEA | 1.50 |
| 1 | APPLE PIE | 2.95 |

PAYMENTS

TYPE    AMOUNT

TOTALS

SUBTOTAL       18.40
TOTAL          18.40
BALANCE DUE:   18.40

FIGURE 22

| CASH | CRED CARD | CHECK | HOUSE | SHORT | TX TAB | REFUND | DONE |

JOHN

TABLE: 2    PARTY NUMBER: 2    BILL: 1

| | | |
|---|---|---|
| 1 | HAMBURGER | 5.95 |
| | NO ONIONS | |
| 1 | TURKEY SAND | 6.50 |
| 1 | COFFEE | 1.50 |
| 1 | ICED TEA | 1.50 |
| 1 | APPLE PIE | 2.95 |

SELECT CREDIT CARD
○ VISA
○ AMERICAN EXPRESS
○ MASTERCARD
○ DINERS CLUB

CANCEL

120

TOTALS

SUBTOTAL        18.40
TOTAL           18.40

BALANCE DUE:    18.40

FIGURE 23

| CASH | CRED CARD | CHECK | HOUSE | SHORT | TX TAB | REFUND | DONE |

JOHN

TABLE: 2　　PARTY NUMBER: 2　　BILL: 1

| 1 | HAMBURGER | 5.95 |
|---|---|---|
|   | NO ONIONS | |
| 1 | TURKEY SAND | 6.50 |
| 1 | COFFEE | 1.50 |
| 1 | ICED TEA | 1.50 |
| 1 | APPLE PIE | 2.95 |

CASH PAYMENT (122)

| TOTAL DUE | 18.40 |
|---|---|
| AMT TENDERED | 20.00 |
| BALANCE DUE | 0.00 |
| CHANGE | 1.60 |

[ DONE ]　　[ CANCEL ]

TOTALS

| SUBTOTAL | 18.40 |
|---|---|
| TOTAL | 18.40 |
| BALANCE DUE: | 18.40 |

FOOD SERVICES ROUTING SYSTEM INCLUDING SEATING LOCATION DISPLAY

BACKGROUND OF THE INVENTION

The present invention relates to the control and routing of food and beverage orders in a dining establishment.

The satisfactory operation of a dining establishment involves a complex interaction among patrons, servers, food preparers and cashiers. Moreover, this interaction takes place in a context having strict time limitations since preparation and serving of orders must be performed promptly, not only to satisfy the patrons, but also to allow multiple seatings at individual seating locations.

Traditionally, these functions have been performed manually, using hand written checks which are carried to the food preparation location, i.e. the kitchen, where they must be correctly interpreted and executed in the proper sequence. When a party has completed its meal, the check must be accurately totalled and promptly presented. In a manual system, this requires servers to regularly halt their order taking and serving functions in order to prepare and present a check.

With the advent of computers, efforts have been made to facilitate the production of a final check by printing such checks in a system which automatically performs the necessary arithmetic operations. Computerized systems for facilitating other aspects of the operation of such an establishment have also been proposed. However, these have found to be complex to implement and deficient in one respect or another.

SUMMARY OF THE INVENTION

It is an object of the present invention to provide a novel food service routing system which automates all aspects of food and beverage ordering and billing in a dining establishment.

Another object of the invention is to allow users of such a system, who may be the servers themselves, to enter all information relating to a food order for a particular seating location so that the order is not only included in a bill to be subsequently printed but is transmitted, at the correct time, to a printer located at the food preparation location.

A further object of the invention is to provide a system which makes available displays that allow selection of food items from stored lists, while also offering the flexibility of providing special orders.

A further object of the invention is to provide a system by which the transmission of orders to the food preparation location is timed in a preselected manner.

Yet another object of the invention is to allow a user of the system to survey all or a selected portion of a dining establishment to identify seating locations which are available to receive a new party.

The above and other objects are achieved, according to the present invention, by a method for routing food orders in a dining establishment using a computer having a monitor and a first printer at an ordering location and a second printer located at a food preparation location and linked to the computer, the method comprising:

displaying on the monitor a main screen having a display region presenting a display of patron seating locations in the establishment and a function region presenting a display of targets which can be selected to control the ordering of food items and the production of a bill;

selecting a seating location on the display region to display on the monitor an order screen displaying menu items in an order region and a bill in a bill region for the selected location;

selecting menu items on the food order screen in order to transfer each food item to the bill region;

causing at least selected items appearing in the bill region to be printed on the second printer; and generating a printed bill on the first printer.

BRIEF DESCRIPTION OF THE DRAWING

FIGS. 2-23 are pictorial views of monitor display screens produces during operation of a system according to the present invention.

DESCRIPTION OF THE PREFERRED EMBODIMENTS

Figure 1:
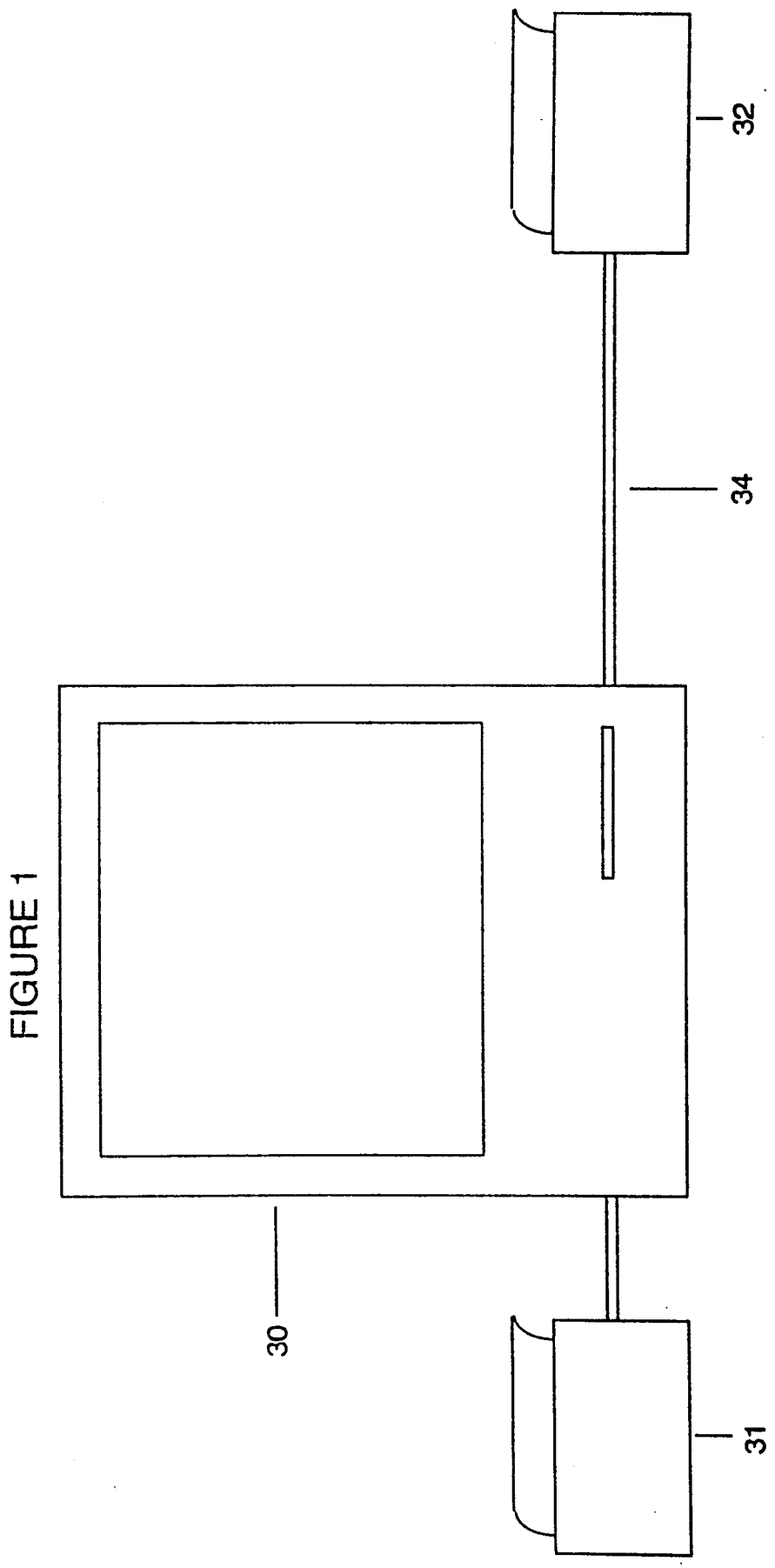
FIG. 1 is a schematic diagram of apparatus for implementing the system according to the present invention.

FIG. 1 shows, in block form the basic physical components of a routing system according to the invention. This system is composed of a computer 30 having a first printer 31 located adjacent, and connected to, computer 30, and a second printer 32 disposed at a food preparation location, normally remote from computer 30, and connected to computer 30 by a cable 34.

The invention has been implemented using, as computer 30, an IBM compatible personal computer and two commercially available programs: Smalltalk 5/286, version 1.1, published by Digitalk, Inc. of Los Angeles, Calif.; and Widgets V286, version 1.0, published by Acumen Software of Palo Alto, Calif. Widgets is a graphics interface program designed to run under Smalltalk. These programs were customized, or configured, to implement the invention on the basis of instructions contained in the documentation which accompanies those programs.

The food routing procedure according to the invention is based, in the first instance, on a main display screen which will appear on the monitor of computer 30 and is composed of a principal display region containing a display of serving locations of all or part of the dining facility. This display, which may represent a floor plan, may show the arrangement of tables, a bar and bar stools, possible along with fixed landmarks, such as partitions, doorways, etc., for orienting the user of the system. Each floor plan feature is represented by a graphic icon which can be configured to correspond in shape and, if desired, in size to the feature being represented.

If the entire dining facility can not be shown on one screen, the desired area can be accessed by scrolling in any conventional manner, or by paging which is desirable if the facility consists of several floor levels.

The icon representing each table may be accompanied by text or subsidiary icons identifying: the table designation; the server assigned to that table; the status of food service to that table, i.e. items have been ordered, bill has been proffered, or bill has been paid so that table is or will shortly be unoccupied; elapsed time since current status of food service began; whether order has been sent to kitchen, etc. Selected information may be associated with the bar and/or each bar stool.

The main screen further includes a function, or command, region with function targets each used for initiating a defined operation identified by a legend in that target.

In each region of the main screen, and underlying screens, a target may be selected by any conventional technique, e.g. by using the cursor keys to highlight a selected target or icon followed by depression of the enter key; by highlighting a selected target by depression of an assigned character key followed by depression of the enter key; by manipulation of a mouse, a trackball or other pointing device; by constructing the monitor of computer 30 in the form of a touchscreen, or to be actuated by a lightpen; or by the use of an electronic drawing tablet, or graphics pad.

Figure 2:
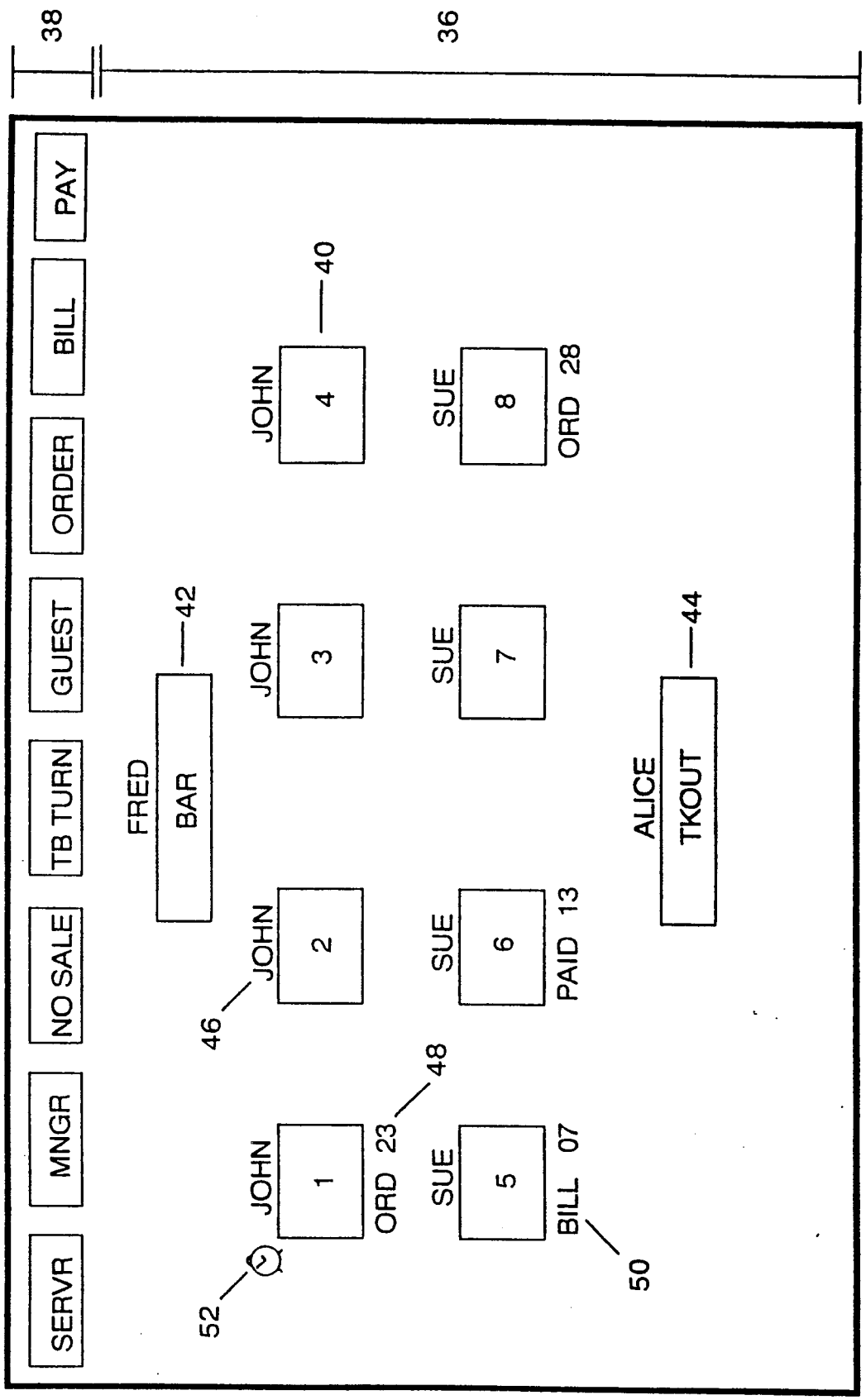

A first example of such a main screen is illustrated in FIG. 2 and includes the principal display region 36 and the command region 38. In the embodiment illustrated in FIG. 2, main display region 36 contains a plurality of icons 40 representing tables, as well as an icon 42 representing a bar and an icon 44 which is associated with take-out orders.

Within each icon there is provided a four character designation 46 identifying the server assigned to that table, the bar or take-out orders. In addition, each table icon contains a numeral which identifies that table. Correspondingly, icons 42 and 44 contain identifying abbreviations.

Below each icon there are designated locations for the provision of specified items of information. For example, in the embodiment of FIG. 2, at a location 48 below each icon, there is provided an indication of the number of minutes since the first order for the party currently at that serving location was placed, a location 50 indicating the last action taken with respect to that table, i.e. the first order has been put in (ORD) the bill has been submitted (BILL), or the bill has been paid (PAID), the latter being equivalent to an indication that the associated table is, or will shortly be, available to receive a new party. Finally, at a location 52 associated with each table icon there is available for display a clock symbol. For example, if the order for the associated table has been transmitted to the kitchen, via printer 32, the clock symbol display is continuous. If the order has been taken but must be transmitted to the kitchen at a time selected by the server, i.e. to provide the proper time spacing between courses, the clock symbol may blink on and off.

Finally, if a special guest is seated at one of the tables, the icon representing that table is enclosed by a double border.

In the illustrated embodiment, function region 38 contains 8 individually selectable targets. Selection of a particular target brings a new display onto the computer monitor screen. This new display may be in the form of a window, or overlay, covering a portion of the display appearing in FIG. 2, and thus having the appearance of being overlaid on the main screen, or may be in the form of a separate screen which replaces the main screen. The form of each supplemental screen and the functions which can then be performed will be described below with reference to the drawing figures illustrating those supplemental screens.

Figure 3:
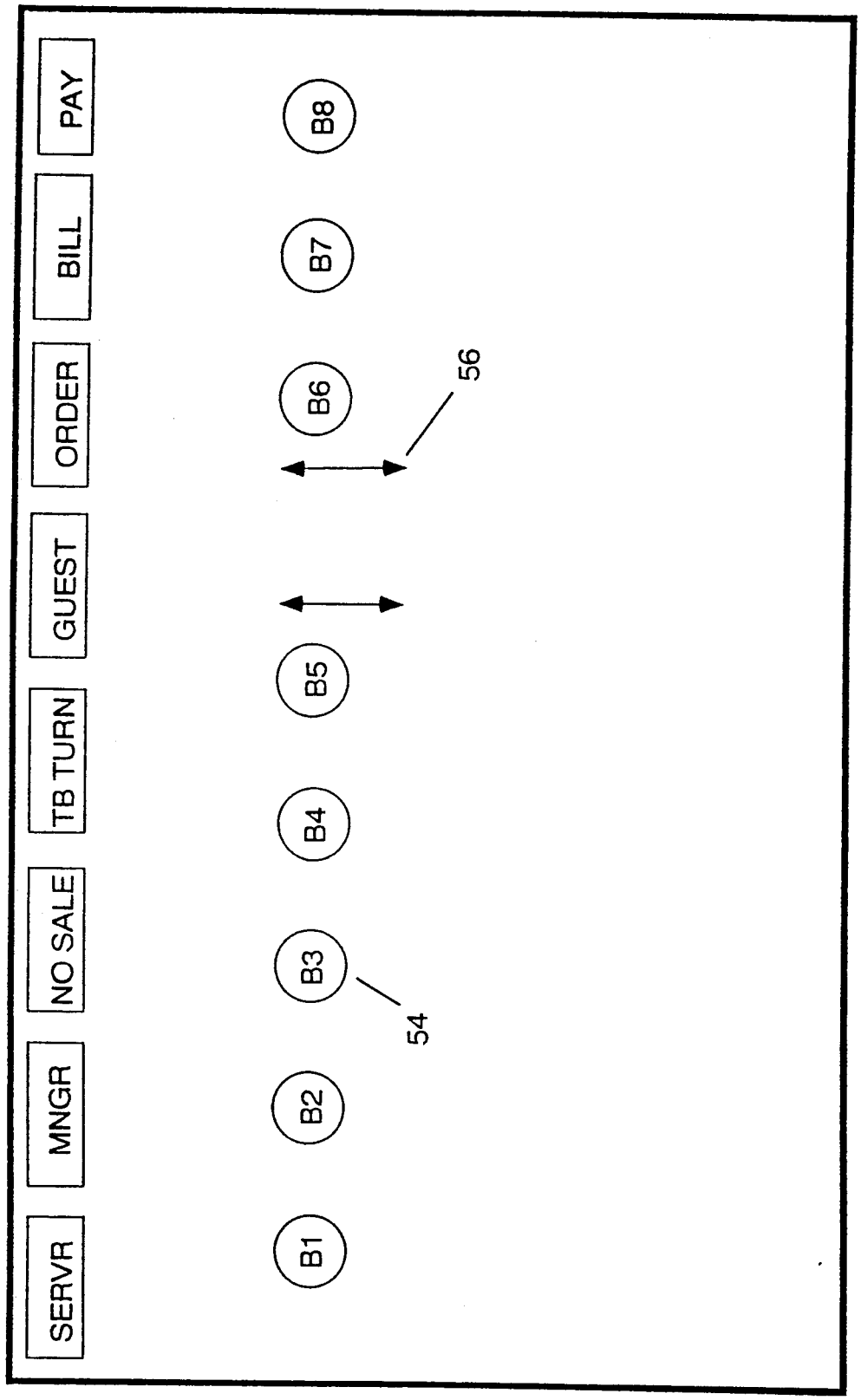

FIG. 3 shows the main screen with a plurality of icons 54 each representing one seat at the bar. This display may replace the icon 42 shown in FIG. 2. As would be possible in the case of the embodiment shown in FIG. 2, the principal display region further includes icons representing fixed landmarks in a restaurant, or a selected area of a restaurant, facilitating association of the table or bar stool icons on the principal display region with the physical layout of the restaurant. In FIG. 3, for example, there are shown two double-ended arrows 56 at the locations of natural divisions of the bar such as server pick-up locations where there is no bar stool. Other types of icons may be added to any principal display region to identify landmarks such as walls, plants, a hostess station, etc. Of course, the type of display shown in FIG. 3 could be combined on a single screen with a display of a group of tables as shown in FIG. 2.

In cases where an entire restaurant cannot be conveniently displayed at one time, the principal display region can include scrolling control regions, for example at the corners or at the middle of each edge, which, when selected, in a manner similar to that described with respect to the function region targets, scroll the display to an adjacent area or a different floor of the dining facility. In place of scrolling, control elements can be provided which, when actuated, simply change from one display to another, in the manner of pages.

Figure 4:
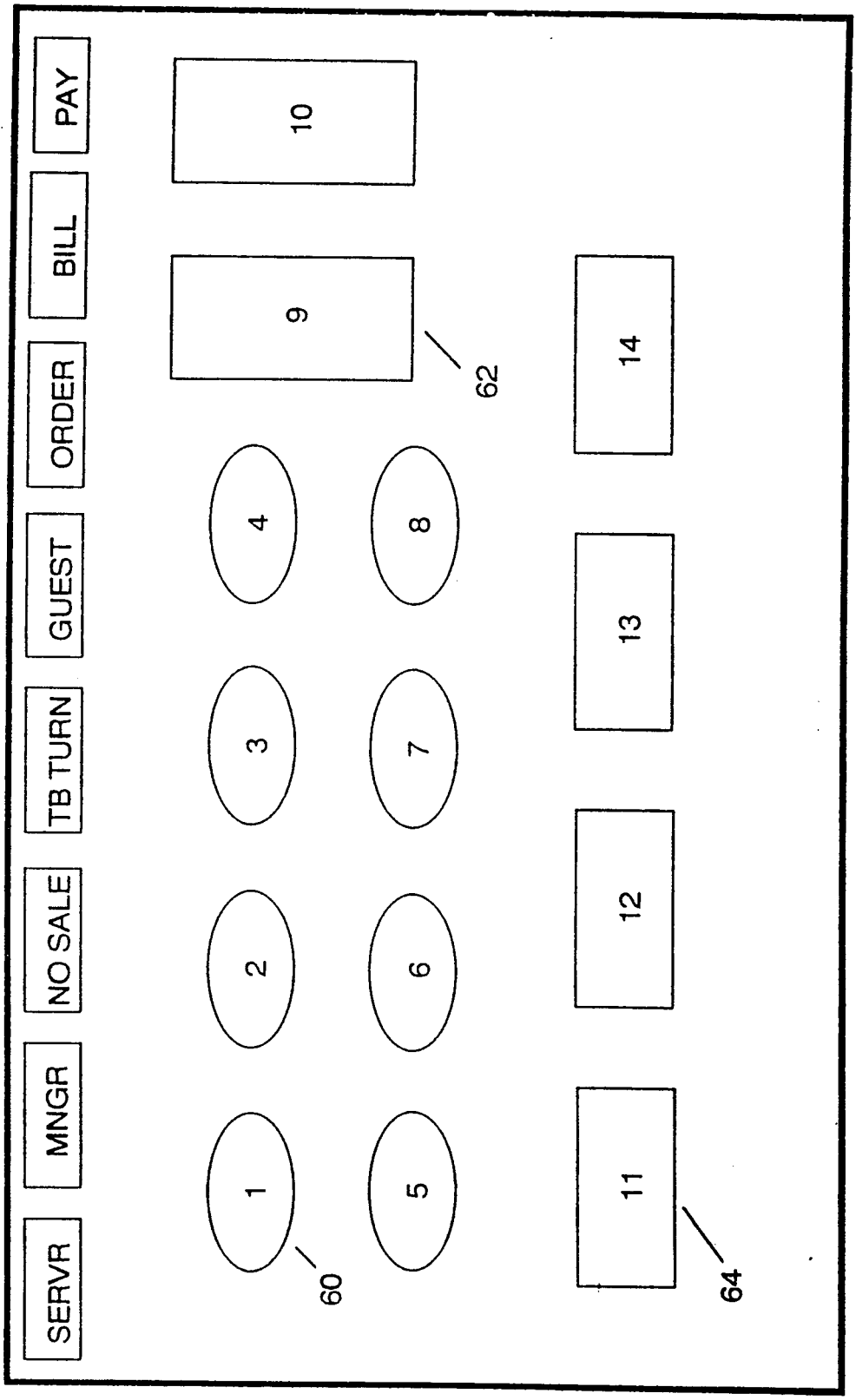

A further embodiment of a main screen according to the invention is shown in FIG. 4, where icons 60 configured to conform to the actual shape of respective tables are provided. The display includes other icons 62 which may represent tables having a different shape or restaurant partitions and icons 64 which may represent areas of a bar.

Regardless of the form of the principal display region, each icon representing a table, the bar, a bar stool, or the take-out location can be individually selected according to one of the techniques described above. Many of the functions to be described below are performed by first selecting a desired table icon, followed by selection of one of the targets in function region 38.

Figure 5:
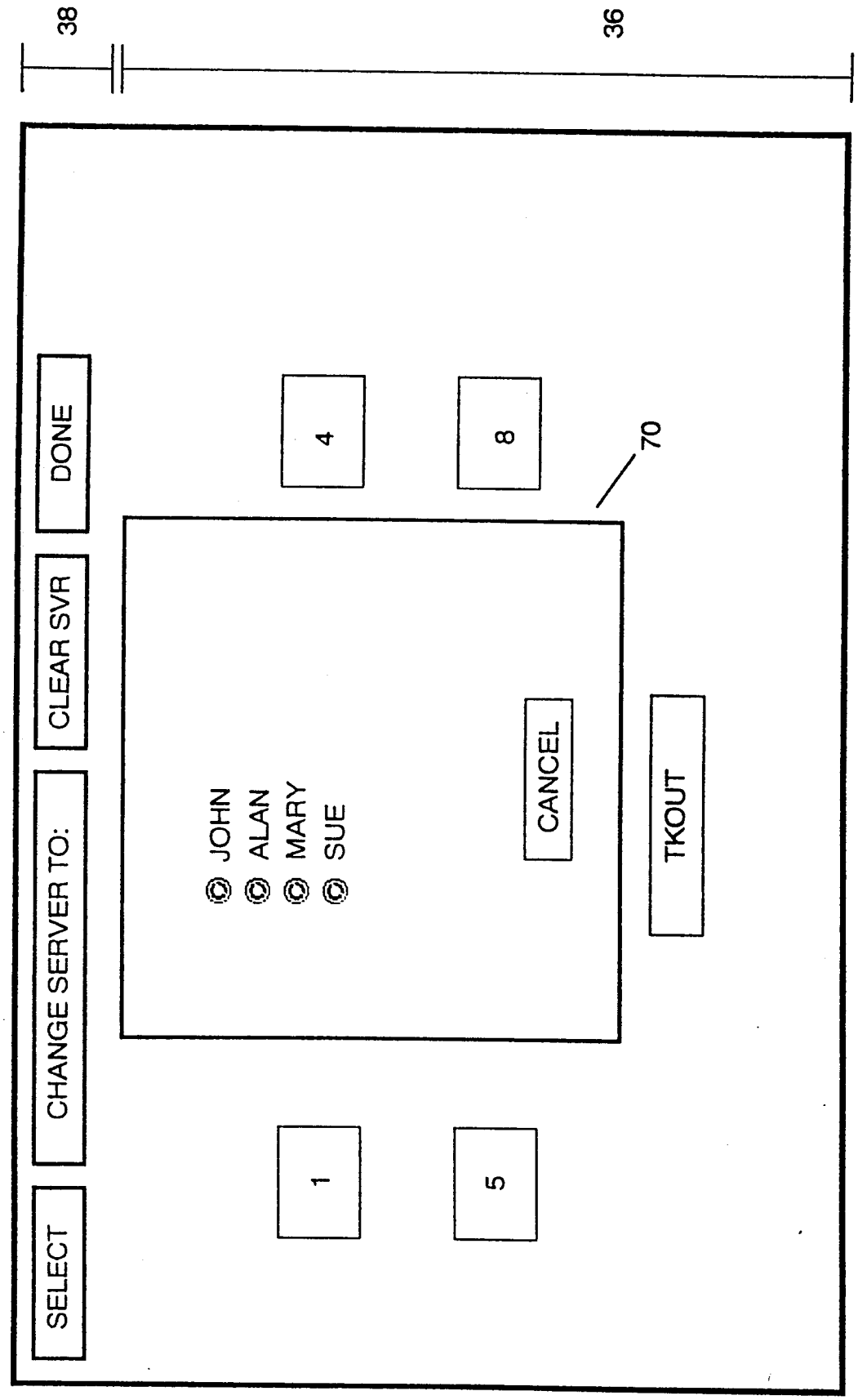

For example, if the designation of a server assigned to a given table or other serving region as described above is to be modified, the particular table or other region is selected, followed by selection of the target SERVER located in function region 38. This sequence changes the display on the monitor to the screen shown in FIG. 5. This superimposes on the principal display region a server selection display 70 and modifies the function region to include targets appropriate to server changes. Display 70 includes a list of all servers employed by the establishment and enables a given server to be highlighted. Thereafter, the function to be performed with respect to that server is determined by selecting the appropriate function target in function region 38. After the desired change has been made, selection of the target labelled "Done" restores the main screen as shown in various forms in FIGS. 2-4.

Figure 6:
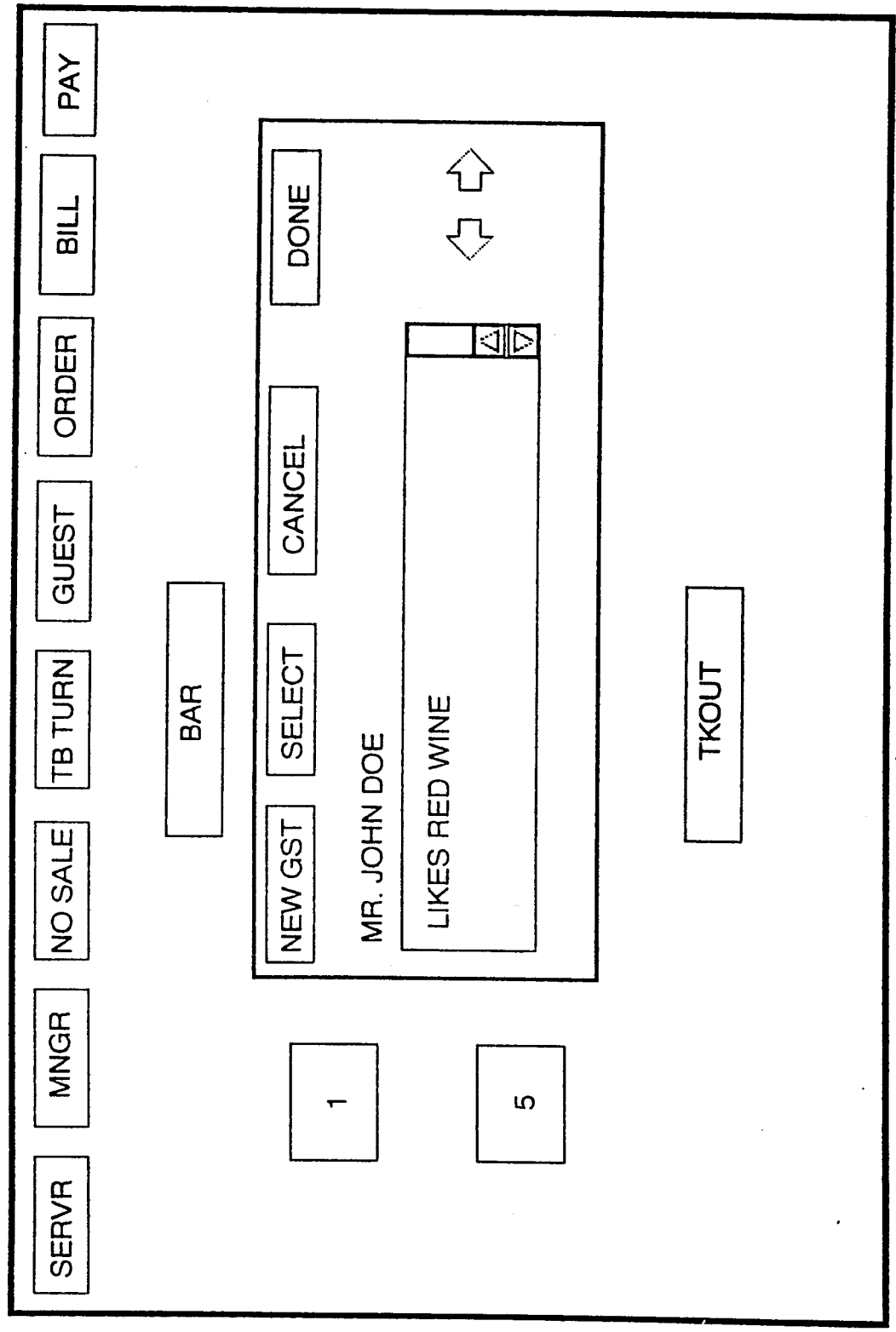

The fact that a special guest is present at the selected table may be associated with the bill that is to be created by activating the Enter Guests target, which brings up the screen shown in FIG. 6 and allows a special guest for whom data has previously been entered to be associated with that bill.

After a table has been selected, the target labelled "SPC GST" in FIGS. 2 and 3 or "Guest" in FIG. 4 is enabled. This target will then be selected if it is known that a special guest, i.e. a regular customer or a celebrity, has been seated at that table. This brings up, on the monitor screen, the Special Guest display shown in FIG. 6. This display may be composed of a plurality of individually selectable screens each identifying a particular special guest based on information previously inputted. Using the arrow targets, the user of the system pages through the various displays until locating the particular Special Guest. Once the desired guest has been identified, the target "Done" is activated, resulting the special designation of that table, as shown in FIG. 2. In addition, if, subsequently, that table is selected from the primary display, followed by selection of the Guest target, the name of that guest will be automatically displayed. By selecting the New Guest target on the display of FIG. 6, information about a new special guest can be entered, or information about an existing special guest can be modified.

In the system according to the present invention, after a given special guest has been thus selected, that guest is associated with the bill which is subsequently created, rather than with the selected table. This allows the system to account for a table having several special guests who are assigned separate checks. When a special guest's check has been paid, a copy is kept in the system and a record thereof made for further use.

When it is desired to enter an order into the system, the server, or a designated system operator who receives written information from the server, selects the appropriate table in principal display region 36 and then selects the ORDER target in function region 38.

According to one feature of the invention, various targets are enabled, i.e. selectable, only if certain preexisting conditions exist. For example, the ORDER target cannot be selected until after a server is assigned to the selected table or other location. When the order target is selected, and if there is presently no open bill for that table, a new display appears on the monitor of computer 30, which new display overlies the main screen and may have the form shown in FIG. 7.

As shown in FIG. 7, this display includes a region 72 where the currently selected serving location, i.e. a table, is identified and a region 74 having the form of a numeric key pad for entering an indication of the number of guests at that table. The key pad of region 74 may be accessed directly with a lightpen or by finger pressure if the monitor screen is a touchscreen, or by using the numeric keypad on the computer keyboard. After the desired number has been inputted, the target labelled "Enter Guests" is selected. When this occurs, the function button, or target, "Done" is enabled. However, before the latter button is activated, various options, shown in display region 76, may be selected. These options include a target labelled "for Training only", which, if selected, allows creation of a dummy bill which will not be transmitted to the kitchen. The region labelled "Default price" allows selection of a special pricing structure, as indicated by the various legends. The box "Order by" allows the order to either be by category, or course, which means that the server will input all appetizers, then all main courses, etc. If the option "Seat Order" is selected, then each item ordered will be followed with the input of information identifying the seat associated with that item. In this case, the computer system will assume that each order is for the seat last designated until a new seat is designated.

The region identified as "use course" allows the server to associate each item with a desired course, or category, i.e. an item which is normally considered a main course may be ordered as an appetizer. Alternatively, each item may be treated as belonging to a course to which it has been pre-assigned, i.e. in this case, soup, for example, could not be timed to be served as a main course. Once a particular course has been identified, all items entered are treated by the system as belonging to that course until a new course is designated.

Finally, the section "Print Order" allows an order which has been entered to be printed out on the kitchen printer at once, or in stages which means that the server will control when the order for each course is transmitted to the kitchen printer.

When all of the required information and optional information has been entered, the "Done" target is activated and the display on the computer monitor changes to the Order Entry Screen shown in FIG. 8. It might be noted that in the system according to the present invention, the Done target is not enabled until at least the number of guests at the table has been entered. Thus, the latter information is compulsory before an order can be entered.

Turning now to the screen of FIG. 8, this, again, includes a principal display region and a function region at the top of the screen. If a bill has already been created for the party at a given table, i.e. an initial order has been entered, then selection of that table via the main screen shown in FIGS. 2-4 causes the Order Entry Screen shown in FIG. 8 to be directly accessed.

The Order Entry Screen shown in FIG. 8 serves directly to enter an order for a table, most often on the basis of displayed listings of menu items.

The principal display area of this screen includes, to the right, a Category window 80 which lists item categories, or courses, usually in the order in which they appear on the printed menus presented to patrons. The user selects a particular category, which causes the menu items within that category to be displayed in a Select item window 82. In the computer system, some items may be associated with a number of different categories. Selection and highlighting of a particular item causes that item to be transferred to a window 84 which represents the bill for that table, or for a given diner if separate guest checks are required.

Figure 9:
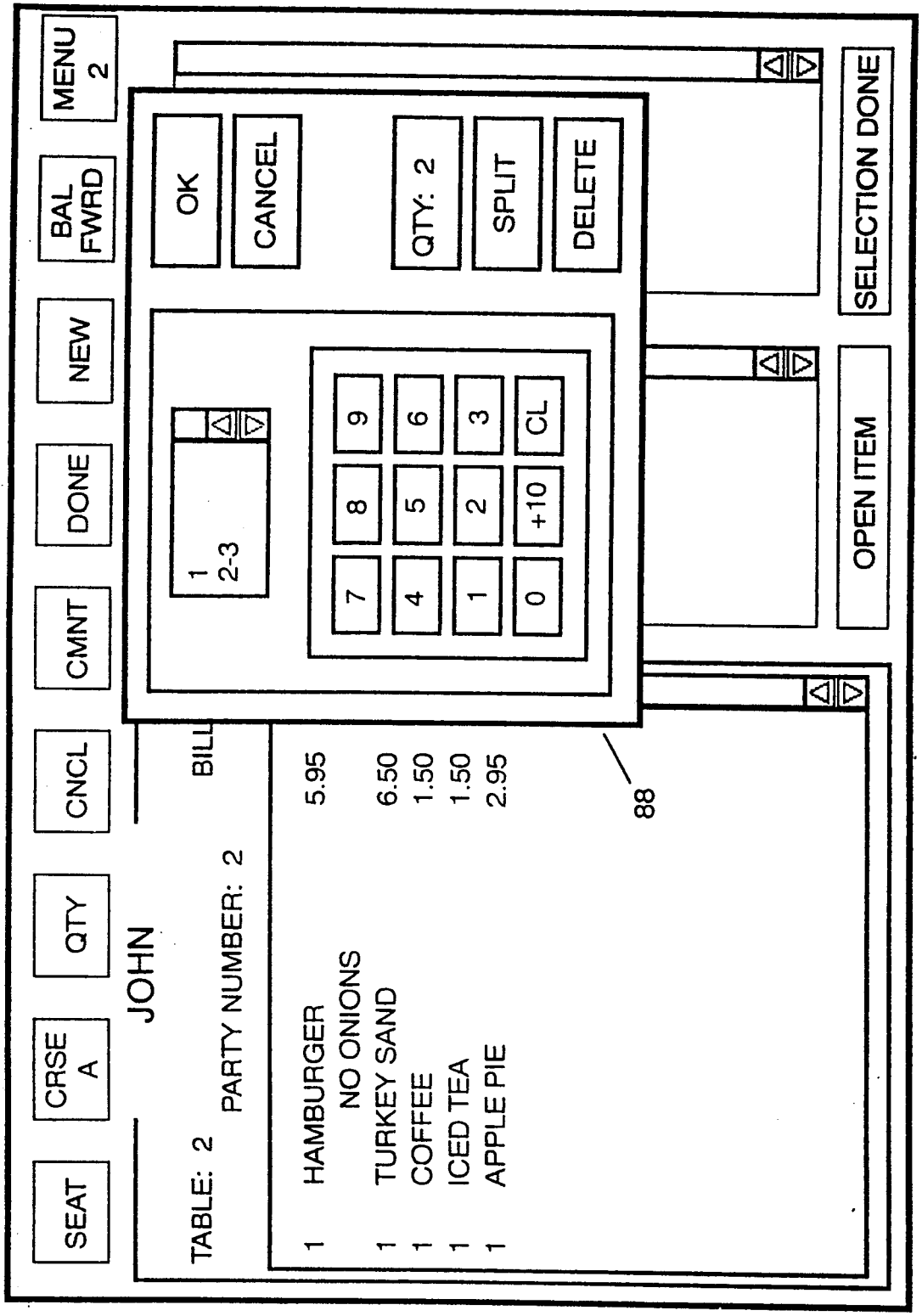

In the function portion of the screen shown in FIG. 8, there is a Seat target which, when selected, produces an overlay 88 as shown in FIG. 9. This overlay allows a given seat at the table to be associated with items which were previously highlighted on bill window 84 of FIG. 8. If "order by seat" was selected in the options in region 76 of the screen of FIG. 7, a seat number must be indicated on the overlay of FIG. 9. This overlay further permits an order to be split between two designated seats. When entry of the necessary information has been completed, the target OK is selected to return to the Order Entry Screen of FIG. 8.

Returning to FIG. 8, selection of the target "Course" produces the overlay 90 of FIG. 10. This overlay includes targets by which the highlighted items on bill region 84 of FIG. 8 are assigned to a selected course, or to no course. After the selection has been made, overlay 90 disappears.

Reverting to FIG. 8, if the "Quantity" target is selected, a quantity overlay 92 appears, as shown in FIG. 11. By selection of one of the numeric keypad targets in overlay 92, the quantity ordered of a highlighted item or items is added to the bill region 84 of FIG. 8. The default quantity is 1. After a quantity has been selected, overlay 92 disappears.

Returning to FIG. 8, if the "Cancel Item" target is enabled, the item or items previously highlighted in window 84 of FIG. 8 are canceled. Such cancellation can be effected at any time before an order containing that item has been printed.

Figure 12:
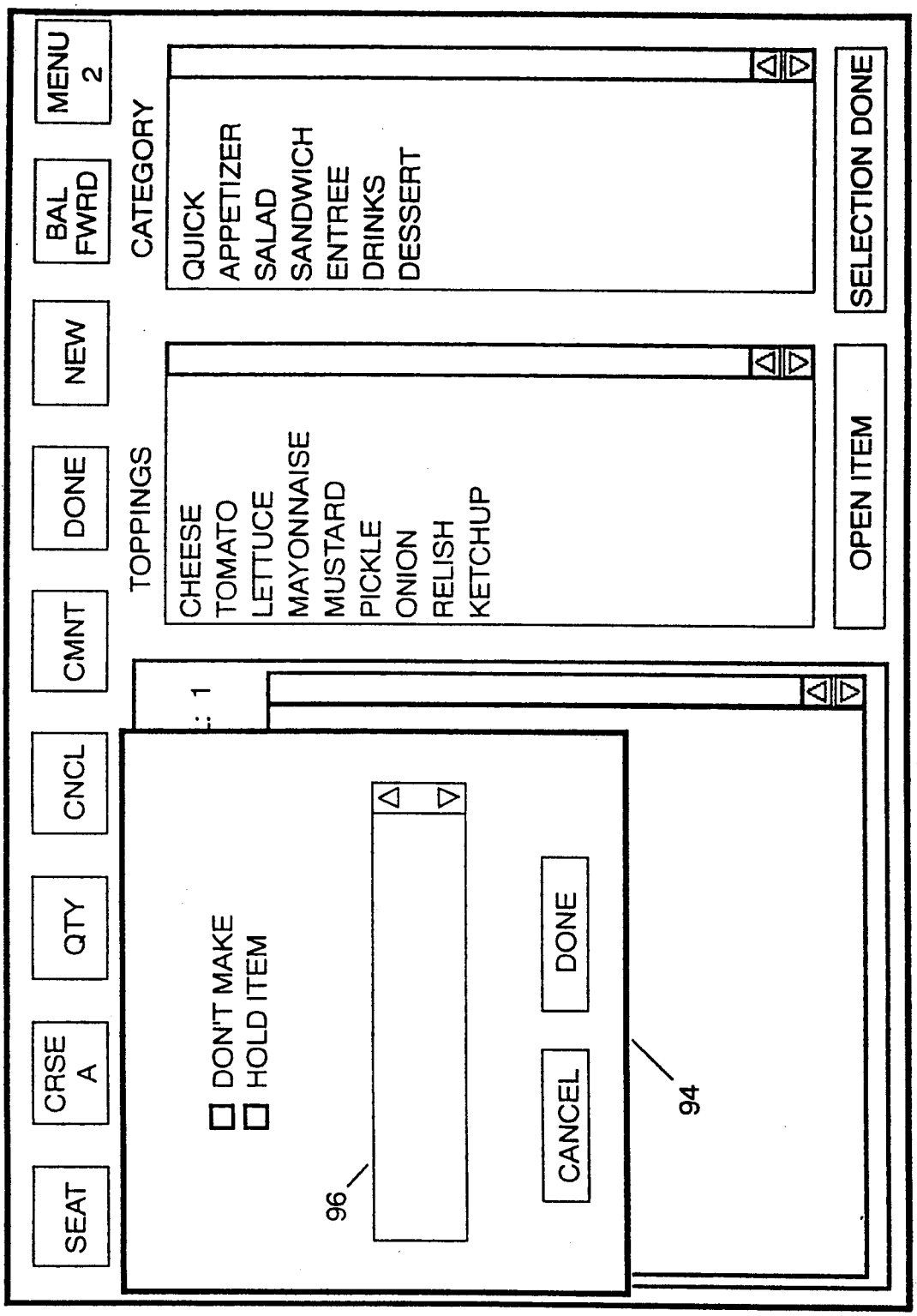

Returning again to FIG. 8, when the "Special Comments" target is selected, overlay 94 shown in FIG. 12 appears. This allows selection of preset comments or the introduction, in input region 96, of a special comment, inputted via the keyboard of computer 30. Selection of the comment "Don't make" means that the item highlighted on region 84 has already been served. Selection of the comment "Hold Item" means that special verbal instructions must be transmitted to the kitchen before the highlighted item is prepared.

Reverting to the Order Entry Screen of FIG. 8, if an item which has been ordered and placed on bill region 84 can be provided with options, or modifiers, a typical example being a slice of pizza, the display in region in 82 is changed to show the available choices, as can be seen partially in FIG. 12. The server goes through the process described earlier to add such options, or modifiers, to bill region 84. The system is configured to automatically vary the price of the item depending on the modifiers added. If the quantity of the item ordered is more than one, and modifiers are indicated, it is assumed that those modifiers are applicable to each item.

Figure 13:
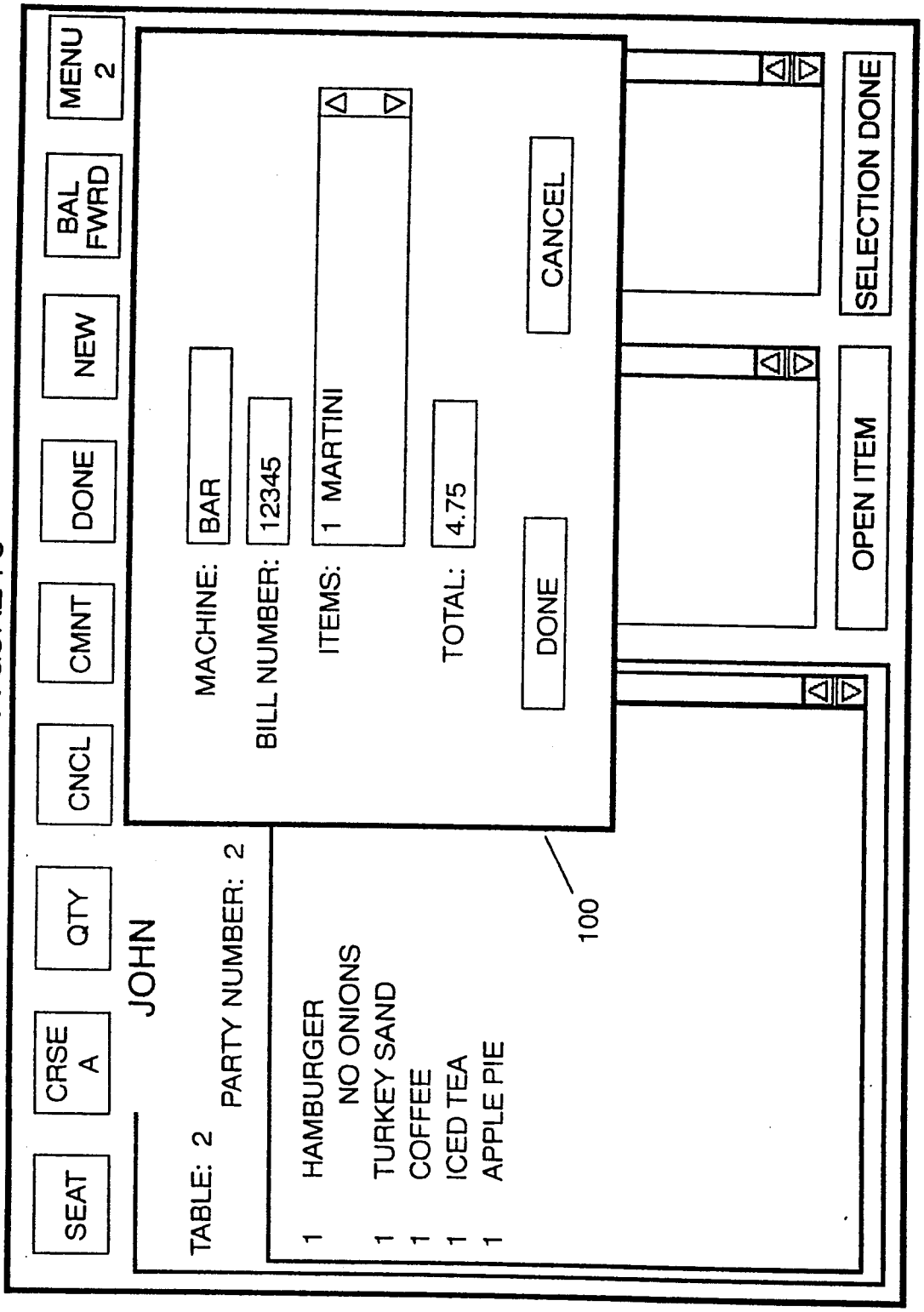

Returning again to FIG. 8, selection of the "Balance Forward" target produces an overlay 100 as shown in FIG. 13. The main use of overlay 100 is to allow a server to add a bar bill to the patron's food check. Generally, it is only necessary for the server to enter information identifying the machine i.e. the cash register on which the bill was originally recorded and the bill number. Then, selection of the target "Done" on overlay 100 returns the display to that shown in FIG. 8.

Figure 14:
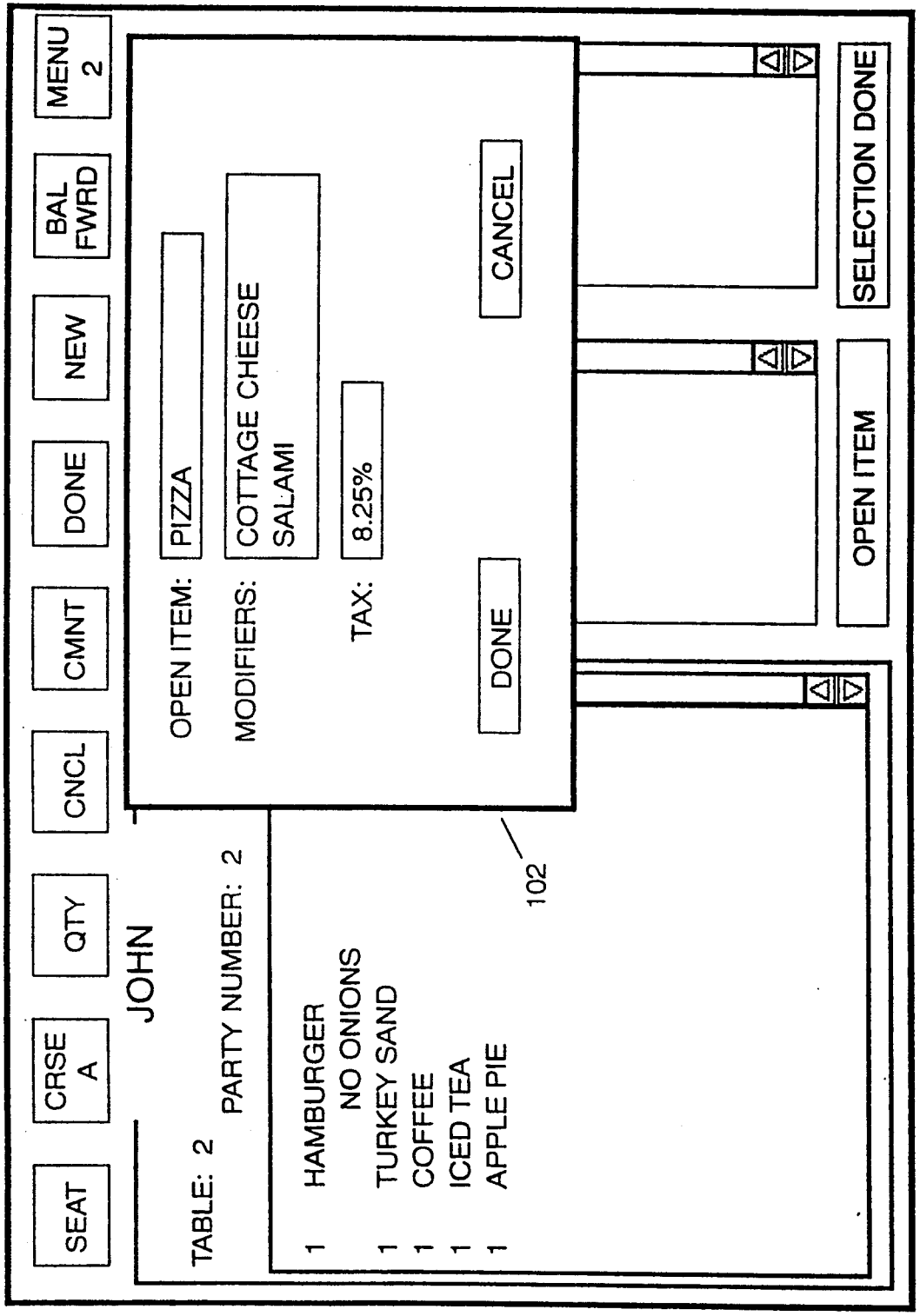

Selection of the target "Open Item" at the bottom of region 82 of FIG. 8 results in the creation of overlay 102 shown in FIG. 14. This allows entry, for example via the keyboard of computer 30, of an item or modifiers which have not been configured to appear in region 82 of FIG. 8. A special tax rate for that item can be selected on overlay 102. After all of the desired information has been inputted, the target Done of overlay 102 is selected to return to the display shown in FIG. 8.

Selection of the "Menu" target on FIG. 8 produces overlay 104 shown in FIG. 15. This enables the server to select a particular menu, for example relative to a given time of day, and will result in display of the appropriate categories and items in regions 80 and 82 of the screen of FIG. 8. Once a selection has been made on overlay 104, the display reverts to that shown in FIG. 8.

Selection of the "Order Done" target of FIG. 8 produces overlay 106 shown in FIG. 16. If, in region 76 of the display of FIG. 7, order in stages (or by courses) has been selected. In this case, the server can indicate the time delay between the transmission of course orders to the kitchen. When the "Done" target is selected, the display reverts to one of the main screens shown in FIGS. 2-4.

If, on the other hand, "print order all at once" was selected in region 76 of FIG. 7, selection of the "Order Done" target of FIG. 8 causes all items previously entered on the bill to be printed in the kitchen, possibly grouped by course.

However, if, for a given table, there are to be separate checks, selection of the "Done" target in overlay 106 returns the display to that shown in FIG. 8 and displays the next check for that table in region 84. Separate checks are created, during the ordering process, by selecting the "New Bill" target of FIG. 8, which results in printing of the bill previously displayed in region 84 and display of the bill, or check, for the next patron at that table.

It might additionally noted that the system according to the present invention can be composed of a plurality of printers at different locations, for example at a bar for the printing of drink orders, or at separate food preparation locations in addition to the kitchen.

After all orders for a table have been entered, which will be indicated by selecting "Order Done" in the display of FIG. 8 after the order for the last seat at the table has been entered, the display reverts to one of the Main Screens as shown in any one of FIGS. 2-4.

If, subsequently, an additional order is to be placed for a given table, highlighting of that table followed by selection of the "Order" target shown, for example, in FIG. 4 returns to the Order Entry Screen of FIG. 8, where the items already ordered are displayed in region 84. The order for additional items is then entered in the manner described above.

When back in the Main Screen, selection of the "Bill" target causes the monitor of computer 30 to display the Bill Screen shown in FIG. 17. The labels on the various targets of this screen are essentially self explanatory. They allow tax to be added to the bill, or the tax rate altered, an alternative price to be provided for a given item, a discount to be included, an item were the entire bill to be voided, editing of the bill, printing of the bill and, by selection of the "Done" target, return to the Main Screen. Selection of the "Void" target produces the overlay 108 shown in FIG. 18. Here again, the functions performed by selecting various targets in overlay 108 are self explanatory. Selected items or all items may be voided. The target "Comp." signifies a complimentary meal.

Figure 19:

Selection of the "Alt Price" target of FIG. 17 produces overlay 110 of FIG. 19, enabling a special price to be placed on the bill.

Selection of the "Tax" target of FIG. 17 produces overlay 112 of FIG. 20.

By enabling the "Done" target of FIG. 17, the display reverts to the Main Screen.

Selection of the "Pay" target results in the presentation of a Pay Screen, as shown in FIG. 21. Here again, the functions performed by the various targets at the top of the screen are self explanatory. Selection of the "Credit Card" target produces overlay 120 of FIG. 22, which allows the particular credit card to be identified. Selection of the "Cash" target of FIG. 21 produces overlay 122 of FIG. 23.

Selection of other targets on Pay Screen 21 produce corresponding overlays which enable various functions to be performed.

Reverting to the Main Screen of FIGS. 2-4, the "Manager" target will produce a display which can be used by the manager for inventory and oversight purposes. The functions associated with this target can also include the generation of reports on a daily or weekly basis.

The "Turn Table" target will produce a screen providing information identifying those tables which are most likely to become available in the near future. Basically, this is based on the time elapsed since entry of the first entry for each table.

Selection of the "No Sale" target would have the effect of simply opening a cash drawer, if one is connected to the computer system. This can be used for changing cashiers, when each cashier takes their cash drawer.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A method for routing food orders in a dining establishment using a computer having a monitor and a first printer at an ordering location and a second printer located at a food preparation location and linked to the computer, said method comprising:
    displaying on the monitor a main screen having a principal display region presenting a graphic display of patron seating locations in the establishment and a function region presenting a display of targets which can be selected to control the ordering of menu items and the production of a bill;
    selecting a seating location on the principal display region to display on the monitor an order screen displaying menu items in an order region and a bill in a bill region for the selected location;
    selecting menu items on the order screen in order to transfer each selected menu item to the bill region;
    causing at least selected items appearing in the bill region to be printed on the second printer; and
    generating a printed bill on the first printer.

2. A method as defined in claim 1 further comprising: inputting to the computer an identification of a selected server assigned to each seating location; and displaying adjacent the display of each seating location on the principal display region of the main screen an identification of the server assigned to that seating location.

3. A method as defined in claim 2 further comprising: inputting to the computer an indication of the current status of service to each seating location; and displaying adjacent the display of each seating location on the principal display region of the main screen a representation of the current status of food service at that seating location.

4. A method as defined in claim 3 wherein said step of displaying includes displaying each seating location in the form of an icon.

5. A method as defined in claim 4 wherein at least certain seating locations are tables and each icon representing a table has a shape corresponding to that of the table.

6. A method as defined in claim 4 wherein each icon has a location on the principal display region which corresponds to the physical location of the associated seating location in the establishment.

7. A method as defined in claim 4 wherein each icon is associated with an alphanumeric identification of the associated seating location.

8. A method as defined in claim 4 wherein said step of displaying comprises including in the principal display region representations of fixed landmarks in the establishment.

9. A method as defined in claim 1 wherein said step of displaying includes displaying each seating location in the form of an icon.

10. A method as defined in claim 9 wherein at least certain seating locations are tables and each icon representing a table has a shape corresponding to that of the table.

11. A method as defined in claim 9 wherein each icon has a location on the principal display region which corresponds to the physical location of the associated seating location in the establishment.

12. A method as defined in claim 9 wherein each icon is associated with an alphanumeric identification of the associated seating location.

13. A method as defined in claim 9 wherein said step of displaying comprises including in the principal display region representations of fixed landmarks in the establishment.

14. A method as defined in claim 1 wherein the order region of the order screen includes a category subregion displaying all available consumable item categories and a consumable item subregion displaying all available consumable items in a selected category, and said step of selecting menu items comprises selecting a displayed category and then selecting a displayed item in the selected category.

15. A method as defined in claim 14 wherein said step of causing items to be printed comprises causing items in different categories to be printed at different selected times.

* * * * *